United States Patent

[11] 3,622,145

[72] Inventor Edwin W. Gibson
72 Barteau Ave., Blue Point, N.Y. 11715
[21] Appl. No. 722,734
[22] Filed Apr. 19, 1968
[45] Patented Nov. 23, 1971

[54] WORK-POSITIONING MEMBER
12 Claims, 7 Drawing Figs.

[52] U.S. Cl. .................................................. 269/297,
269/305, 269/319
[51] Int. Cl. .................................................. B23g 3/18,
B23g 3/00
[50] Field of Search ............................................. 269/9, 10,
291, 297, 303, 305, 315, 319, 298, 299, 311, 314;
33/174 S, 174 TA, 174 TB, 174 TC, 174 TD;
77/62, 63; 83/468; 143/169; 287/127

[56] References Cited
UNITED STATES PATENTS
3,166,853  1/1965  Marcus ........................ 33/174
2,435,256  2/1948  Whitmore .................... 77/62
2,560,413  7/1951  Carlson ....................... 287/127 UX FOREIGN PATENTS
1,151,478  8/1957  France ......................... 33/174
1,457,983  12/1965  France ......................... 83/468

Primary Examiner—William S. Lawson
Assistant Examiner—Leon Gilden
Attorney—Arthur T. Groeninger ABSTRACT: A member for positioning a piece of work in a selected angular position for machining purposes. The member is removably held on a machine table by a pair of locating pins extending from the member into T slots on the table. The member includes a banking surface for positioning a piece of work. The locating pins are positioned on the member so that the banking surface bears a predetermined selected angular relation to the table. During machining, the table moves in a fixed relation to the machine tool and thus, work positioned by the member will be machined at a selected angle. The angle can be adjusted by provision for a plurality of apertures on the member, selected pairs of which may be utilized to adjust the position of the locating pins, and in turn, the position of the banking surface. In the alternative, the angle can be adjusted by providing a plurality of banking surfaces angularly related to each other so that a selected banking surface may be utilized to machine at a selected angle.

PATENTED NOV 23 1971 3,622,145

INVENTOR.
EDWIN W. GIBSON
BY
ATTORNEY

INVENTOR.
EDWIN W. GIBSON
BY
ATTORNEY

INVENTOR.
EDWIN W. GIBSON
BY
ATTORNEY

WORK-POSITIONING MEMBER

BACKGROUND OF THE INVENTION

The art of accurately positioning a workpiece at a predetermined angle with respect to a worktable for angle machining is ordinarily a complex process requiring a high degree of skill.

For example, when machining a corner of a rectangular block in accordance with conventional practice, the machinist must first set up a member providing a banking surface which is parallel to the longitudinal axis and travel of the machine table. A selected number of gauge blocks are then banked against the banking surface and a sine bar is then placed with one end against the banking surface and the other end against the gauge blocks. The setting up of the banking member is time consuming; selecting the proper number and size of gauge blocks requires trigonometric calculation; the cleaning of the gauge blocks and finally, the wringing of the gauge blocks together is extremely time consuming.

Attempts have been made to utilize a vise for locating a workpiece on a machine table. Problems in using a vise for angle machining are numerous. Firstly, the vise base is seldom so accurately formed as to be capable of forming a true parallel with the table. Secondly, a burr or speck of dirt between the vise and the machine table may cause error. Thirdly, the clamping action of the movable jaw of the vise causes the workpiece to move radially upward thereby throwing the workpiece out of square. Fourthly, a vise can only be used for relatively small work. Fifthly, a workpiece extending several inches or more above the vise jaws is subject to considerable vibration and since all clamping action is exerted at the bottom of the workpiece, the work can be moved by the force of the cutter in cutting and possibly break the cutter or ruin the workpiece.

Various other devices for positioning a workpiece for angle machining are illustrated in U.S. Pat. No. 1,308,451, to Schachat, U.S. Pat. No. 1,551,995, to H. J. Lovenston, U.S. Pat. No. 2,366,385, to H. B. Comfort and U.S. Pat. No. 3,166,853, to J. W. Marcus. One common feature of all these other devices is the use of a vertically extending support plate for positioning the work. This limits the size of the work as the vertical distance between the tool and machine table is limited. Further, the work is less rigid than if fastened directly to the machine table. This less rigid mounting results in vibration and chatter which will create a rough finish and may possibly cause the tool to bite in and break. In order to avoid this undesireable result, an operator is normally required to reduce tool speed and also, the rate of travel of the tool across the workpiece. The depth of cut is also reduced. Other limitations are requirements for gauge blocks and for squaring and bolting of the assembly to a machine table.

Finally, in U.S. Pat. No. 3,276,133, a still further prior art device is shown comprising a right angular member which is adapted to be banked off a rail adjacent a grinding machine work support. The device is deficient in that it requires the use of gauge blocks together with very completely machined radial end portions so as to provide proper banking off of the rail and off of the gauge blocks. Further, the device is limited to machine tables having a rail adjacent to a longitudinal edge thereof.

BRIEF DESCRIPTION OF THE INVENTION

The work-positioning member of the present invention is adapted to position a piece of work at a selected angle on a machine table. The piece of work is directly clamped to the table and therefore, it is free from vibration during machining.

The member is adapted to be removably fixed to a machine table. For this purpose, a pair of locating pins extend from the member. The locating pins are adapted to extend into a T slot of a machine table engaging the walls thereof with a slight press fit thereby providing a secured but readily removable connection. The locating pins can be fixed to the member, or in the alternative, selectively positioned on the member by extending the locating pins through a selected pair of apertures on the member.

The member includes at least one banking surface which is accurately formed so as to make full surface contact with a piece of work. The position of the locating pins or in the alternative, the position of the selected pair of apertures, through which the locating pins extend, are such that the banking surface bears a predetermined angular relation to the table. The need for a sine bar, gauge blocks, setting up of a parallel, etc., is thus eliminated.

In operation, the table moves in a fixed relation to the machine tool. Accordingly, the work bearing against the banking surface will be machined at a predetermined angle.

The angle of the banking surface can be adjusted by extending the locating pins through other selected pair of apertures. The greater the number of apertures, the greater the number of angles which can be formed.

The diameter of the portion of the locating pin extending through the apertures in the work-positioning member may be of reduced dimension so as to minimize the space occupied by an individual aperture, thereby permitting the accommodation of a greater number of apertures.

The member may have several angularly related banking surfaces so that with the member in one position, a workpiece may be positioned at a selected angle or at an angle related (such as the complement) to the selected angle. The member can be reversed on itself allowing versatility as to the direction the work extends.

The member can be positioned at various locations on the machine table enabling the member to be used in conjunction with workpieces of various sizes up to the capacity of the machine.

IN THE DRAWINGS

DETAILED DESCRIPTION

Figure 1:
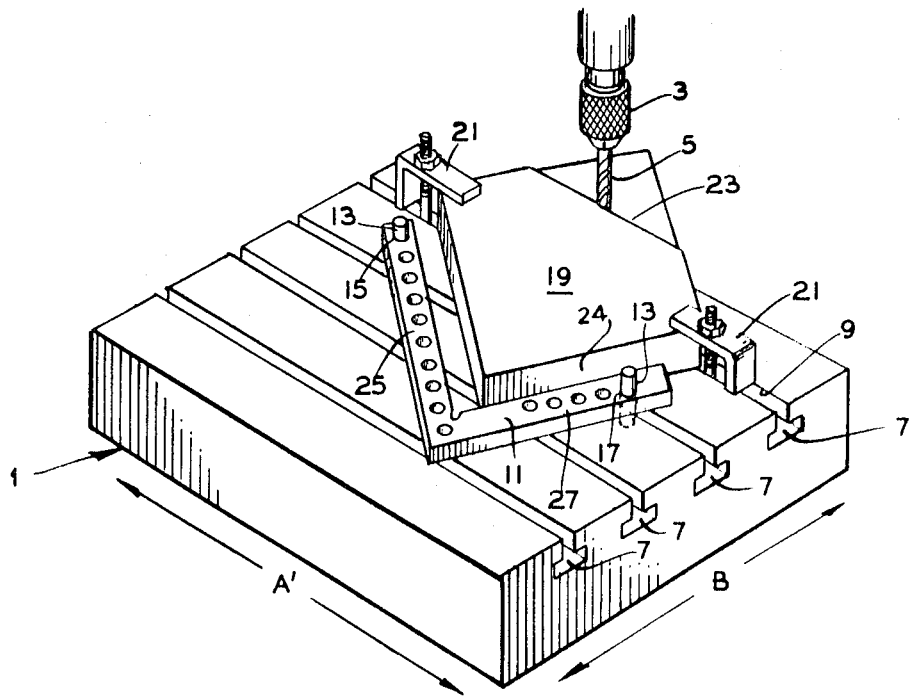
FIG. 1 is a perspective view showing a portion of a conventional milling machine including the table and cutter sections, together with the work-positioning member of the present invention.

Referring to the drawings and more particularly to FIG. 1, a portion of a conventional milling machine is shown comprising a machine table 1, adapted to support a workpiece, a power-driven spindle 3, and a cutter 5 mounted in a spindle. As is conventional, the cutter 5 is fixed in location and cutting is accomplished by moving table 1 and the workpiece supported thereby relative to cutter 5. The table 1 may be raised or lowered or moved in a horizontal plane in two directions at right angles to the axis of cutter 5, either longitudinal travel as indicated by arrow A, or transverse travel as indicated by arrow B. The adjustable supporting structure for the table (not shown) and the driving means for the spindle (not shown), is conventional and well known in the art.

The table 1 includes a plurality of T slots 7 which are accurately formed so as to extend parallel to the path defined by longitudinal travel of table 1. Sidewalls 9 of T slots 7 also extend parallel to the longitudinal travel of table 1 and at right angles to the surface of the table 1. With this fixed relation to the table and to the movement thereof, sidewalls 7 are used, as hereinafter explained, as a locating source for proper positioning of the work-positioning member 11 of the present invention.

The work-positioning member 11, in accordance with one embodiment of the present invention, is shown in FIG. 1, removably secured to the machine table 1 by locating pins 13. Locating pins 13 extend through apertures 15 and 17 in work-positioning member 11 into the T slots 7. The locating pins 13 are of such a diameter so as to form a slight press fit with the apertures 15 and 17 and with sidewalls 9 of T slot 7. It is thus necessary, that the locating pins be of sufficient length so as to at least partially extend into the apertures and partially into the T slot. As shown in FIG. 1, the locating pins 13 are of uniform diameter since as shown the diameter of the apertures is equal to the entrance width of T slot 7. It is to be understood that the locating pin may be stepped so as to accommodate varying entrance widths and aperture diameters.

A piece of work, such as that shown at 19 in FIG. 1, is banked off of a banking surface of the work-positioning member 11. The workpiece 19 is then held fixed in place by any conventional clamping means such as that shown at 21. As will be hereinafter explained in more detail, apertures 15 and 17 are related to the banking surface so that the workpiece 19 is positioned at a predetermined selected angle relative to the longitudinal travel of the table 1 during machining. Accordingly, upon longitudinal travel of the table 1 with the cutter 5 in a work-engaging position, a cut will be made along a line, illustrated, e.g., by line 23, at the predetermined angle, relative to surface 24 of the piece of work. Since the work is directly clamped to the table, there will be a minimum of vibration and the cutter 5 will make a peripheral cut thereby removing the stock faster and more accurately then would be the case if the stock were vertically supported and cut by end cutting.

Figure 2:
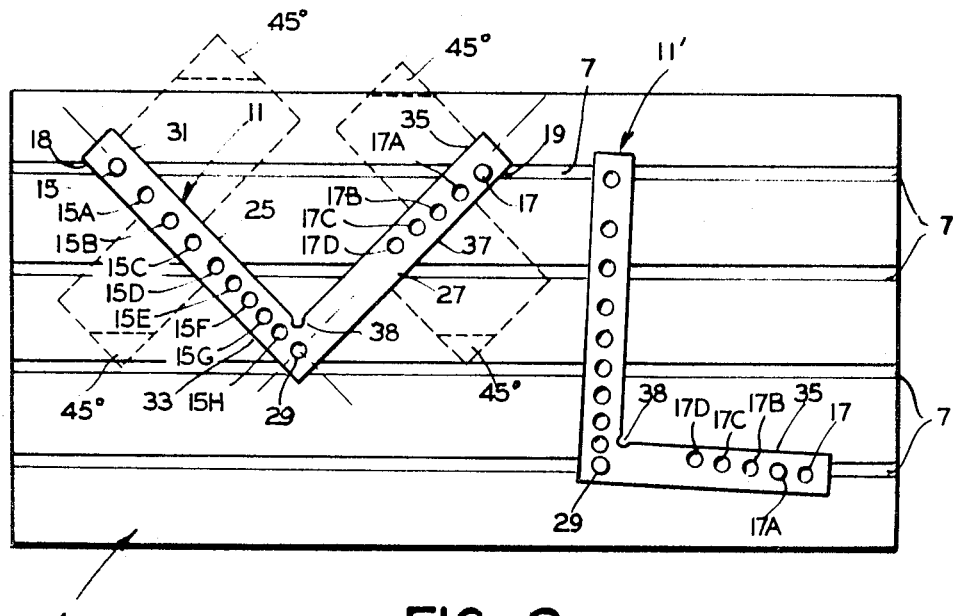
FIG. 2 is a plan view of a machine table having a work-positioning member of the present invention thereon.

Referring more particularly to the work-positioning member 11, reference is now made to FIG. 2. The work-positioning member 11 comprises a generally L-shaped member having leg members 25 and 27, the longitudinal axis of which are at right angles to each other and intersect at the axis of aperture 29 formed at the juncture of legs 25 and 27. The sides 31, 33 of leg member 25 and the sides 35 and 37 of leg member 27 constitute banking surfaces for a piece of work and are accurately formed to lie in a plane parallel to the longitudinal axis of the respective leg members.

Leg 25 includes aperture 15 and in addition a plurality of apertures 15A, 15B, 15C, 15D, 15E, 15F, 15G and 15H. The apertures are precision bored so that they extend perfectly perpendicularly to the top surface of the machine table 1. Leg 27 includes aperture 17 and in addition a plurality of apertures 17A, 17B, 17C, and 17D. The series of apertures 17 are also precision bored so as to extend perfectly perpendicular to the top surface of table 1. The longitudinal axis of leg 25 extends through and at right angles to axis of apertures therein. The longitudinal axis of leg 27 extends through and at right angles to the axis of aperture 17 while apertures 17A, 17B, 17C, and 17D are gradually offset therefrom, for reasons hereinafter explained.

Apertures 15 and 17 are equidistant from aperture 29. For reference purposes, each of the apertures 15 and 17 will be considered 10 units from aperture 29. Accordingly, when locating pins 13 are passed through these apertures into T slot 7, a rectangular piece of work bearing against any one of the banking surfaces 31, 33, 35 and 37 would be cut at a 45° angle as indicated by phantom lines 38.

In order to adjust the angle at which banking surfaces 35 and 37 are disposed, intermediate apertures 15A, 15B, 15C, 15D, 15E, 15F, 15G and 15H are approximately positioned 8.4 units, 7 units, 5.8 units, 4.7 units, 3.6 units, 2.7 units, 1.76 units, and 0.90 units, respectively, from aperture 29. These distances, respectively correspond to trigonometric values so that banking surfaces 35 and 37 may be adjusted to angles of 40°, 35°, 30°, 25°, 20°, 15°, 10°, and 5° with respect to the longitudinal travel of table 1. Surface 37 will actually be banked at the supplement of these angles but this is not significant as a workpiece banked off of surface 37 will be machined at the same angle as a workpiece banked off of surface 35.

The angular adjustment is accomplished by removing the locating pin 13 from aperture 15 (the pin in aperture 17 not being removed) and pivoting the member 11 so that a selected aperture of the 15 series overlies T slot 7. When a selected aperture of the 15 series is positioned over T slot 7, the locating pin 13 is reinserted through the selected aperture into the T slot 7. Banking surfaces 35 and 37 are then disposed at the selected angle.

The purpose of apertures 17A, 17B, 17C and 17D will now be described. These apertures are so positioned as to represent differences of 1°. Accordingly, as shown at 11' in FIG. 2, the placing of locating pins 13 in apertures 29 and aperture 17A would position banking surfaces 35 and 37 at a 1° angle relative to the longitudinal axis of the table. By removing the locating pin 13 from aperture 17 (the pin in aperture 29 not being removed) and by pivoting the member 11 so that a selected aperture 17B, C, or D overlies T slot 7, angles of 2°, 3° and 4° can be set up. Apertures 17A, B, C and D may be used in conjunction with apertures 15H and 15G etc. for any intermediate angle between 5° and 10°, between 10° and 15°, etc. Accordingly, surfaces 35 and 37 can be placed at any angle between 1° and 45°.

Banking surfaces 31 and 33 of the work-positioning member 11 are disposed at right angles to the banking surfaces 35 and 37. Accordingly, banking surfaces 31 and 33 are disposed at an angle representing the complement of any angle at which surfaces 35 and 37 are disposed and thus they may be disposed at any angle between 45° and 90°. By increasing the number of apertures in leg 25, it is to be recognized that small fractions of any number of angles may be formed.

Since banking surface 31 extends at right angles to banking surface 35, a rectangular piece of work may be made flush with both surfaces during machining, thereby enhancing the rigidity of the piece of work. In order to accommodate the corner portion of such a piece of work, a recess 38 is provided at the juncture of surfaces 31 and 35. Without this recess the work might be offset due to an arc formed at the juncture.

Because of the limited dimensions of the work-positioning member 11 illustrated in FIGS. 1 and 2, only a limited number of apertures 15 and 17 can be placed thereon. In order to overcome this deficiency, a modification of the present invention is shown in FIG. 3.

Figure 3:
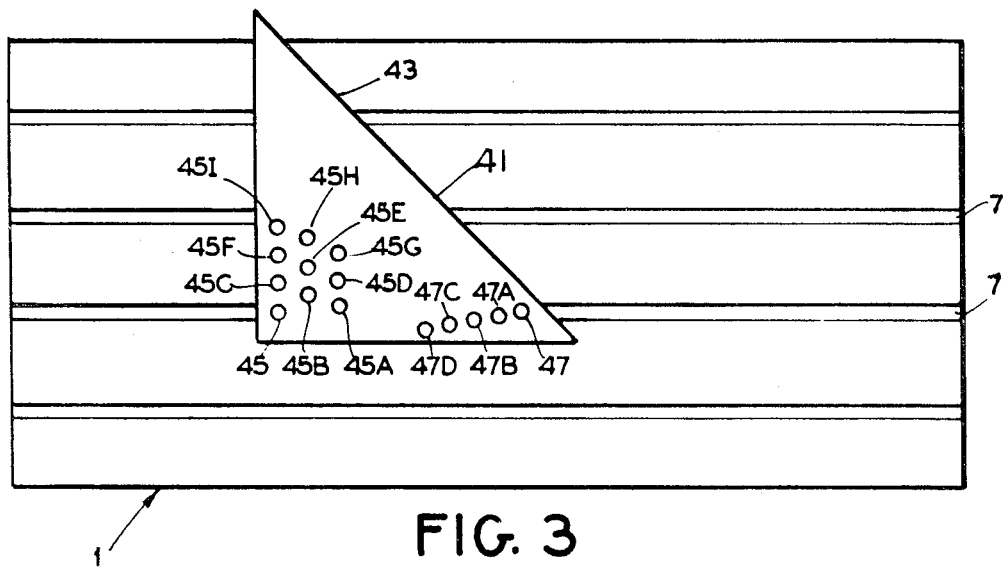
FIG. 3 is a plan view illustrating a modified embodiment of the present invention.

Referring to FIG. 3, a work-positioning member 41 is shown including a banking surface 43 and a pair of apertures 45 and 47. Banking surface 43 is disposed at a 45° angle relative to the centerline connecting the centers of apertures 45 and 47. Accordingly, when work-positioning member 41 is secured to the table 1 by means of locating pins being press fitted through apertures 45 and 47 into T slot 7, the banking surface 43 defines a 45° angle relative to the longitudinal travel of the table 1.

The angular disposition of banking surface 43 can be adjusted in increments of 5° to 40°, 35°, 30°, 25°, 20°, 15°, 10°, 5° and 0° by removing the locating pin from aperture 45, and pivoting work-positioning member 41 so that a selected aperture 45A, B, C, D, E, F, G, H, or I overlies the T slot 7. By using a selected aperture 47A, B, C, or D, the angular disposition of the banking surface 31 can be further refined to angular adjustments of 1°, 2°, 3° or 4°. For example, when work-positioning member 41 is secured to the table by means of locating pins being press fitted through apertures 45 and 47A into T slot 7, banking surface 43 defines a 44° angle.

Figure 4:
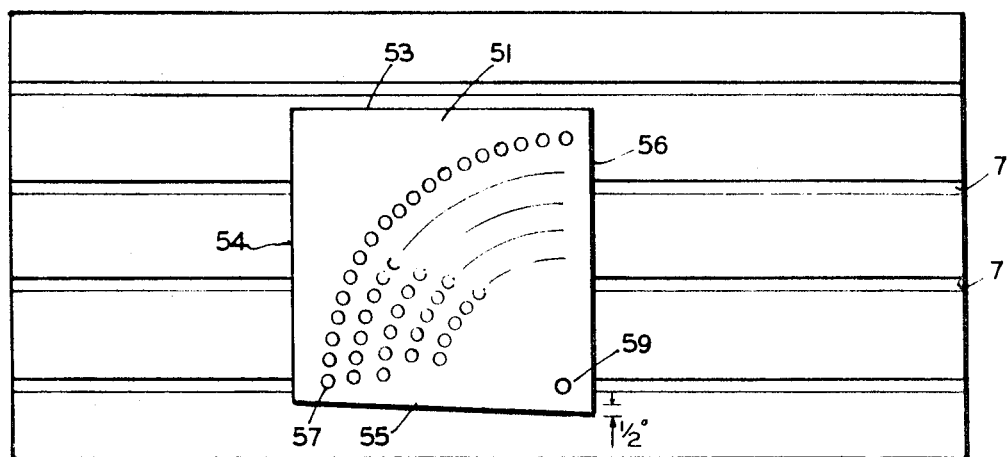
FIG. 4 is a plan view illustrating a further modification of the present invention.

Referring to FIG. 4, a further modification of the present invention is shown. A work-positioning member 51 is illustrated including banking surfaces 53, 54, 55 and 56. Banking surface 55 is disposed at a ½° angle, for reasons hereinafter explained, relative to the banking surface 53.

A plurality of apertures 57 extend over a 90° arcuate range on work-positioning member 51. Apertures 57 are arranged in a series of adjacent rows and are adapted to cooperate with aperture 59 so that banking surface 53 can be displaced at intervals of 1° from 1°-90° in a manner similar to work-positioning member 41, of FIG. 3. For simplicity, some of the apertures 57 are not shown.

An additional feature of the work-positioning member 51 is that any angle at ½° intervals between 0 and 90 can be formed by use of banking surface 55. As hereinbefore noted, banking surface 55 is disposed at a ½° angle with respect to banking surface 53, therefore banking surface 55 will bank at ½° offsets from banking surface 53.

From the above description, it will be noted that the number of angles which can be formed is limitless. The number can be increased by increasing the number of apertures in the work-positioning member or in the alternative, by increasing the number and relative angularity of the banking surfaces of the work-positioning member. In view of this last-mentioned feature, it is to be understood that the member can be constructed in a variety of shapes.

Since the entrance width of T slot in a machine table is standardized and quite large, a requirement that the apertures in the work-positioning member correspond in diameter to this width would necessarily limit the number of apertures which could be placed in a work-positioning member of the present invention. In order to avoid this problem, and with particular reference to FIG. 5, a modified locating pin can be employed.

Figure 5:
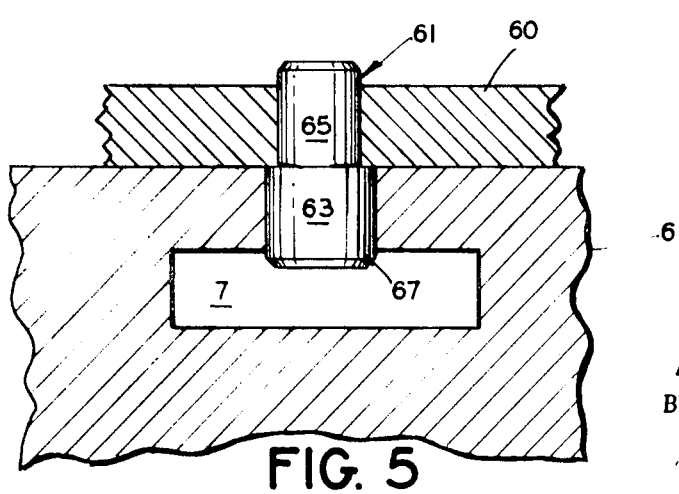
FIG. 5 is a cross section illustrating a modified locating pin for the work-positioning member of the present invention.

Referring to FIG. 5, a work-positioning member 60 is shown having an aperture of reduced diameter, i.e., less than the entrance width to slot 7.

A modified locating pin 61 is shown including a base portion 63 which is adapted to be press fitted into the T slot 7. The upper portion 65 of locating pin 61, which extends through the aperture in the work-positioning member 60, is of reduced dimension providing a press fit with the aperture.

Accordingly, the apertures in a work-positioning member of the present invention can be of any size and their number in a particular work-positioning member has no limitation due to diameter requirements.

The peripheral lower edge of base portion 65 is chamfered at 67 so as to facilitate entrance of the locating pin into the T slot 7.

Figure 6:
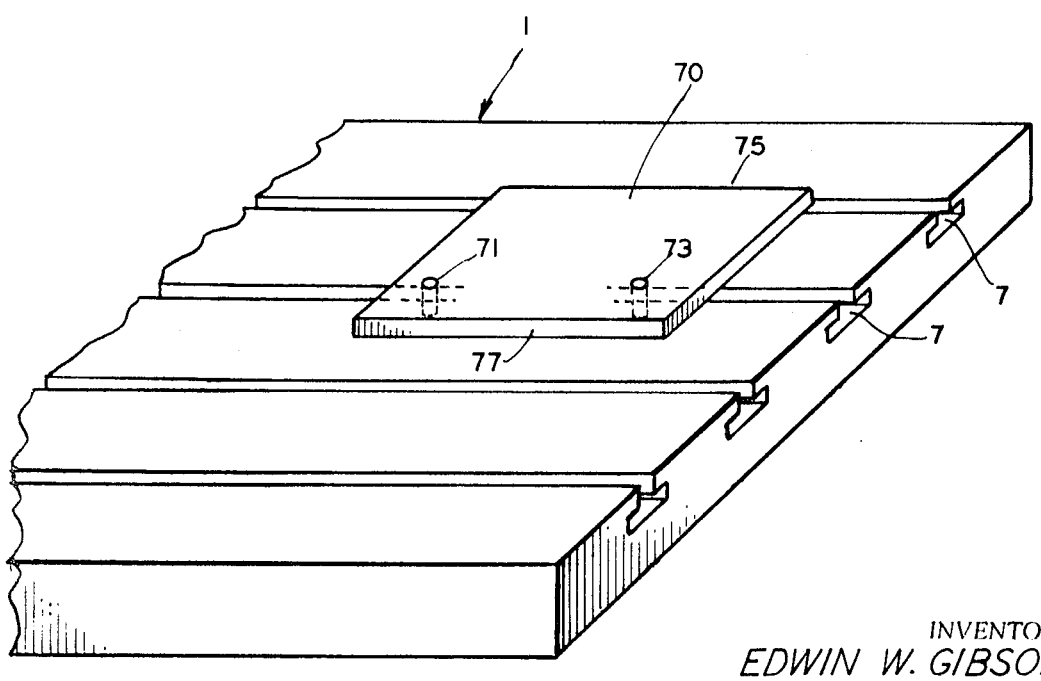
FIG. 6 is a perspective view illustrating a further modification of the present invention.

One of the most important uses of the present invention is the ease in which a parallel may be set upon a machine table. Referring to FIG. 6, a modified work-positioning member 70 is illustrated which is designed to accomplish this single function.

Referring to FIG. 6, work-positioning member 70 including a pair of locating pins 71 and 73 which are fixed to member 70 and are adapted to be press fitted into the T slots 7. As shown, pins 71 and 73 are fixedly press fitted into apertures in the member 70. It is to be understood that pins 71 and 73 may be made integral with member 70 or connected in any conventional manner such as a threaded connection. The member 70 includes banking surfaces 75 and 77 which are adapted to extend parallel to the longitudinal travel of table 1.

While the locating pins have been illustrated as being of cylindrical shape, it is to be understood that they may be of any shape, e.g., rectangle, square, etc., which is capable of being press fitted into a T slot. If an alternative shape is selected, it is to be understood that the apertures in the work-positioning member would have to be changed to accommodate the modified pin.

The present invention lends itself to a special application on a numerically controlled tape machine where setup for short runs do not justify expensive holding fixtures. This is particularly true when machining mirror opposite as illustrated in FIG. 7.

Figure 7:
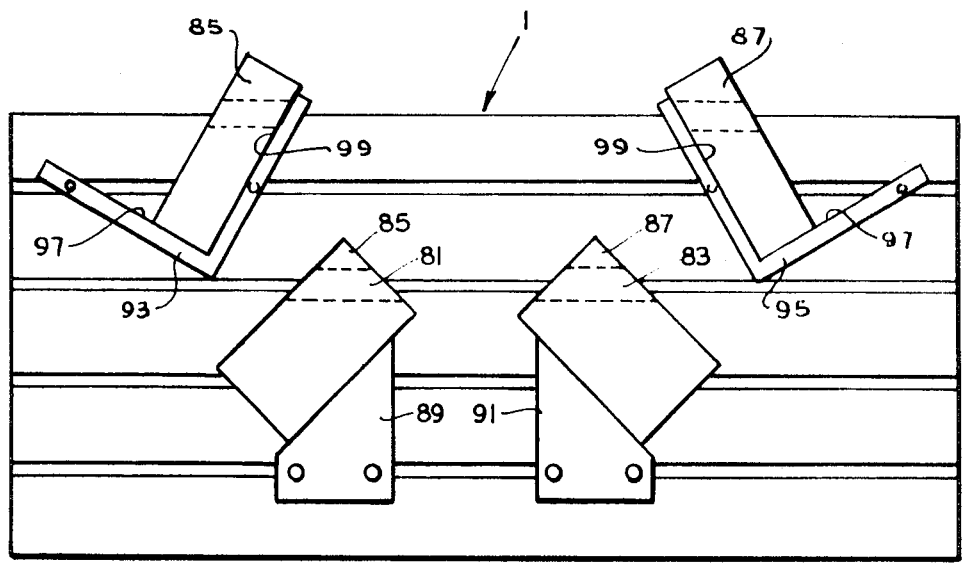
FIG. 7 is a plan view illustrating a novel application of the present invention.

As shown in FIG. 7, mirror opposite grooves 81 and 83 are to be machined in workpieces 85 and 87 which are positioned by work-positioning member 89 and 91. The two work-positioning members are turned back to back. The tool can be machining in both of its directions of movement with one work-positioning member being loaded and unloaded while the other is being machined.

Since workpieces 85 and 87 are rectangular, it is preferable to position workpieces 85 and 87 by L-shaped positioning members such as those shown at 93 and 95. In this instance, the workpieces 85 and 87 are in engagement with banking surfaces 97 and 99 of the positioning members. This would exactly locate the workpieces not only for cutting at a predetermined angle, but in addition, would provide for the cuts being made at identical locations on each of the workpieces. With work-positioning members 89 and 91, the workpieces must be adjusted to precise locations on the banking surfaces so that the locations of the cut are identical.

While the present invention is illustrated with both of the locating pins 13 extending into one of the T slots, it is to be understood that adjacent T slots 7 could be utilized with each T slot receiving one or more pins.

While not shown in FIGS. 3–7, it is to be understood that conventional clamping means would be used to hold the work down.

In the accompanying drawings, the present invention is shown as applied to a milling machine of the known type. It is to be understood that the present invention could be utilized with any machine table having locating pin receiving means, such as but not limited to, T slots, the only requirement being that the receiving means have a predetermined relation to the travel of the table.

It should be understood that the foregoing disclosure relates only to preferred embodiments of the invention, and that it is intended to cover all changes and modifications which do not constitute departures from the spirit and scope of the invention set forth in the appended claims.

What is claimed is:

1. A work-positioning member, said member including at least one banking surface, first and second means secured to said member, said first and second means including cylindrical portions having diameters to form a slight press fit with the sidewalls of a keyway in a worktable so as to secure the member in place.

2. A work-positioning member as defined by claim 1, said first and second means being integral with an extending perpendicular to said member.

3. A work-positioning member as defined by claim 1, said member including a plurality of apertures, said means comprising a plurality of locating pins press fitted into and extending through said member.

4. A work-positioning member as defined by claim 1, said member comprising a member having a pair of leg portions, a plurality of apertures in one of said leg portions aligned with a longitudinal axis of said leg portion.

5. A work-positioning member as defined by claim 1, including means for adjusting the angle at which said member is disposed on a work support in increments of a preselected unit.

6. A member for positioning a piece of work in a selected angular position for machining purposes including at least one banking surface, first means for releasably securing said member to a keyway in a work support, second means for releasably securing said member to a keyway in a work support, said first means cooperating with said second means for selectively locating said banking surface in a selected angular position relative to a work support, said member confining said first and second means from movement along the length of said member.

7. A member for positioning a piece of work in a selected angular position for machining purposes including at least one banking surface, first means for releasably securing said member to a keyway in a work support, second means for releasably securing said member to a keyway in a work support, said first means cooperating with said second means for selectively locating said banking surface in one of a plurality of predetermined selected angular positions relative to a work support, said first means including a plurality of apertures, at least one of said apertures being disposed adjacent to an edge of said member, at least another of said apertures being disposed inwardly from said edge and said one aperture.

8. A member as defined by claim 6, said first and second means including apertures, locating pins press fitted into said apertures.

9. A member as defined by claim 8, wherein said locating pins includes a reduced portion, said reduced portion extending through said apertures.

10. A member for positioning a piece of work in a selected angular position for machining purposes including at least one banking surface, first means for releasably securing said member to a keyway in a work support, second means for releasably securing said member to a keyway in a work support, said first means cooperating with said second means for selectively locating said banking surface in one of a plurality of predetermined selected angular positions relative to a work support, a machine table including a plurality of T slots, said first means and said second means including means capable of being press fitted into said T slots.

11. The combination comprising a work-positioning member and a work support, said work support including a keyway, said member including at least one banking surface, means for adjustably connecting said member to said keyway so as to adjust the angle of said banking surface relative to said work support.

12. A work-positioning member, a work support supporting said member, said member including a plurality of banking surfaces, each of said banking surfaces being disposed at a predetermined selected angle relative to each other so as to dispose said banking surfaces at different predetermined selected angles relative to said work support, means for adjustably connecting said member to said work support so as to adjust the angle of said banking surfaces relative to said work support.

* * * * *